United States Patent
Moliton et al.

(10) Patent No.: US 7,609,453 B2
(45) Date of Patent: Oct. 27, 2009

(54) OPHTHALMOLOGICAL DISPLAY INCLUDING A DEVICE FOR ADJUSTING FOCUS

(75) Inventors: Renaud Moliton, Charenton-le-Pont (FR); Benjamin Rousseau, Charenton-le-Pont (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 45 days.

(21) Appl. No.: 11/628,631

(22) PCT Filed: Jun. 21, 2005

(86) PCT No.: PCT/FR2005/050474
§ 371 (c)(1),
(2), (4) Date: Sep. 7, 2007

(87) PCT Pub. No.: WO2006/013297
PCT Pub. Date: Feb. 9, 2006

(65) Prior Publication Data
US 2008/0158684 A1    Jul. 3, 2008

(30) Foreign Application Priority Data
Jul. 2, 2004  (FR)  .................. 04 51425

(51) Int. Cl.
*G02B 27/14*  (2006.01)
(52) U.S. Cl. .................. 359/630

(58) Field of Classification Search ......... 359/630–634, 359/13, 14; 345/7, 8; 348/115; 349/11
See application file for complete search history.

(56) References Cited

U.S. PATENT DOCUMENTS

| 2,847,901 A | 8/1958 | Sassaman et al. |
| 4,307,941 A | 12/1981 | Dziemba .................. 350/255 |
| 5,353,134 A | 10/1994 | Michel et al. .................. 359/52 |
| 5,886,822 A * | 3/1999 | Spitzer .................. 359/630 |

FOREIGN PATENT DOCUMENTS

EP     0592318     4/1994

OTHER PUBLICATIONS

International Search Report—Nov. 21, 2005.
French Search Report—Nov. 21, 2005.

* cited by examiner

*Primary Examiner*—Joseph Martinez
(74) *Attorney, Agent, or Firm*—Sofer & Haroun, LLP

(57) ABSTRACT

The invention relates to an ophthalmological display comprising an optical imager (10) for shaping light beams emitted by an optical element of a light beam generator system (20) and directing them towards the eye (O) of the wearer as to enable information content (I) to be viewed, said display being fitted with a device for adjusting focusing by adjusting the length of said light beams between said element and the imager. According to the invention, the generator system comprises a stationary part (21) referred to as a stationary plate, to which said optical element is connected by a moving connection (22) that is adjustable by an actuator device.

11 Claims, 4 Drawing Sheets

OPHTHALMOLOGICAL DISPLAY INCLUDING A DEVICE FOR ADJUSTING FOCUS

RELATED APPLICATION

The present application is a national phase application of PCT/FR2005/050474, which in turn claims the benefit of priority from French Patent Applications No. 04 51425, filed on Jul. 2, 2004, the entirety of which are incorporated herein by reference.

FIELD OF THE INVENTION

The present invention relates to an ophthalmological display comprising an ophthalmic lens and an optical imager for enabling information of the image or multimedia type to be projected. The term "lens" is used herein to mean an optical system suitable in particular for being positioned in a frame for eyeglasses.

BACKGROUND OF THE INVENTION

U.S. Pat. No. 5,886,822 discloses an ophthalmic lens presenting a projection insert. Such a projection insert is constituted by an optical imager for shaping light beams delivered by an electronic and optical system for generating light beams from an electronic signal, of the miniature screen, laser diode, or light-emitting diode (LED) type. The optical semiconductor directs light beams towards the eye of the wearer in order to enable information content to be viewed.

An example of a prior art display is shown in its environment in greater detail in FIG. 1.

By way of example, the optical imager is of the same type as described in above-mentioned U.S. Pat. No. 5,886,822.

An electronic signal carrying information is brought to a miniature screen 1 by a cable 7. On the basis of this signal, the miniature screen 1, illuminated by a background projector 2, generates a pixel image corresponding to the information. By way of example, it is possible to use a "Kopin Cyberdisplay 320 color" screen generating images comprising 320×240 pixels and having dimensions of 4.8 millimeters (mm)×3.6 mm. The screen 1 is held by a mechanical interface 3 in position relative to the optical imager 5. A protective shell 4 protects all or part of the assembly.

The optical imager 5 comprises a propagation prism 5a, a counter prism 5b, a quarterwave plate 5c, and a spherical Mangin mirror 5d. The spherical Mangin mirror is a planospherical lens whose spherical face has been made reflecting by aluminum plating treatment or the equivalent.

The imager 5 also includes polarization separator treatment 6 which may be implemented in the form of a deposit of thin layers either on the propagation prism 5a or on the counter prism 5b, or by means of a film stuck between the two above-mentioned elements.

The imager 5 is embedded in a molded lens 9 and the housing is disposed on one side of the lens 9. On the same principle, the housing could be placed facing forwards at the back of the lens, an injection element forming a 90° reflector element then being included in the lens.

The word "lens" is used in particular for an optionally correcting lens suitable for mounting in a frame for eyeglasses. This ophthalmic lens presents conventional functions such as correcting eyesight, and coatings against reflection, dirtying, scratching, etc.

In order to enable focusing to be adjusted so as to adjust the viewing distance of the information image and consequently adjust the image so that the wearer can see it in sharp and comfortable manner, the lens 9 is secured to a plate 10 carrying two rods 10A and 10B on which the housing 4 is engaged in slidable manner. During this adjustment, the housing is engaged manually to a greater or lesser extent on the slide rods to adjust the distance D, and thereafter it is held in position by a transverse screw (not shown).

That type of device for adjusting focusing raises the following technical problems.

Depending on how it is adjusted, the overall size of the display varies. This can lead to constraints in its design.

This type of device inevitably leads to a considerable amount of slack between the slide rods and the housing, which harms the accuracy of the display.

The housing is generally made of plastics material and the plate 10 together with its rods 10A and 10B are made of metal. This results to the housing wearing quickly and further increasing the slack and lack of precision of the display.

Finally, in that prior art, the adjustment is performed manually in the sense that the wearer needs to take hold of the housing and cause it to slide along the rods until proper focus is obtained. Naturally, such an arrangement is not very accurate and is not very comfortable in use, being poorly adapted to everyday use that is not experimental.

OBJECTS AND SUMMARY OF THE INVENTION

The invention solves those problems by proposing a display of overall size that does not vary and that is comfortable to handle while making an adjustment.

To do this, the invention provides an ophthalmological display comprising an optical imager for shaping light beams emitted by an optical element of a light beam generator system and for directing the beams towards the eye of the wearer so as to enable information content to be viewed, the display being fitted with a focus adjustment device for adjusting the length of said light beams between said element and the imager, said imager being integrated in a lens for mounting in a frame for eyeglasses, the display being characterized in that said adjustment device is internal to a housing containing said light beam generator system, and in that said generator system includes a stationary part referred to as a stationary plate, having connected thereto said optical element via a moving connection that is adjustable by an actuator device.

In a preferred embodiment, said optical element is secured to a second plate connected to the stationary first plate by said moving connection.

And advantageously, said actuator device is external to said housing.

In the invention, the housing serves only to provide protection against attack from the surrounding medium, from impacts and from flattening, and also to provide a sealing function, and the housing is preferably removable, being put into place last. The hosing is advantageously put into place by being secured to the stationary plate or part.

Preferably, said connection is an elastically-deformable element.

The dimensional and positioning characteristics of this deformable element can be calculated by finite element type calculation methods in order to determine the characteristics of the displacement.

In a particular embodiment, said elastically-deformable element is constituted by a deformable fork.

In a first variant, said actuator device is constituted by a knob provided with an eccentric cylinder, said knob being mounted to turn relative to a stationary portion of the housing and said eccentric cylinder being in abutment against said second plate.

This characteristic presents the advantage of being suitable for being automatically prestressed so as to avoid any slack and determine the amount of force that needs to be exerted on the knob so as to improve user comfort and avoid any damage. Furthermore, by turning the knob continuously in the same direction, it is possible to pass through all desired positions on the path of the moving plate. Finally, because of its relatively large size, a knob is particularly adapted to achieving very small displacements accurately.

In a second variant, said actuator device is constituted by a screw screwed into a stationary portion of the housing and in abutment against said second plate.

Advantageously, an adapter is in a reference position relative to the imager and receives said generator system together with its focus adjustment device by engagement of at least two studs.

This embodiment presents the advantage of decoupling the various optical and mechanical functions. Each part performs one function only, thus enabling maximum precision to be obtained, whether mechanically or optically. The adapter ensures that the device is positioned relative to the imager.

And preferably, said adapter is secured to said stationary plate.

The adapter can be secured to the lens by adhesive, screw-fastening, or any appropriate means.

The connection between said focus adjustment device and said adapter may be releasable.

Said optical element is preferably a miniature screen.

In which event, said stationary plate advantageously carries an associated optical component.

In a preferred application, said imager is integrated in a lens.

BRIEF DESCRIPTION OF THE DRAWINGS

The invention is described below in greater detail with reference to figures that merely show a preferred embodiment of the invention.

DETAILED DESCRIPTION

Figure 2:
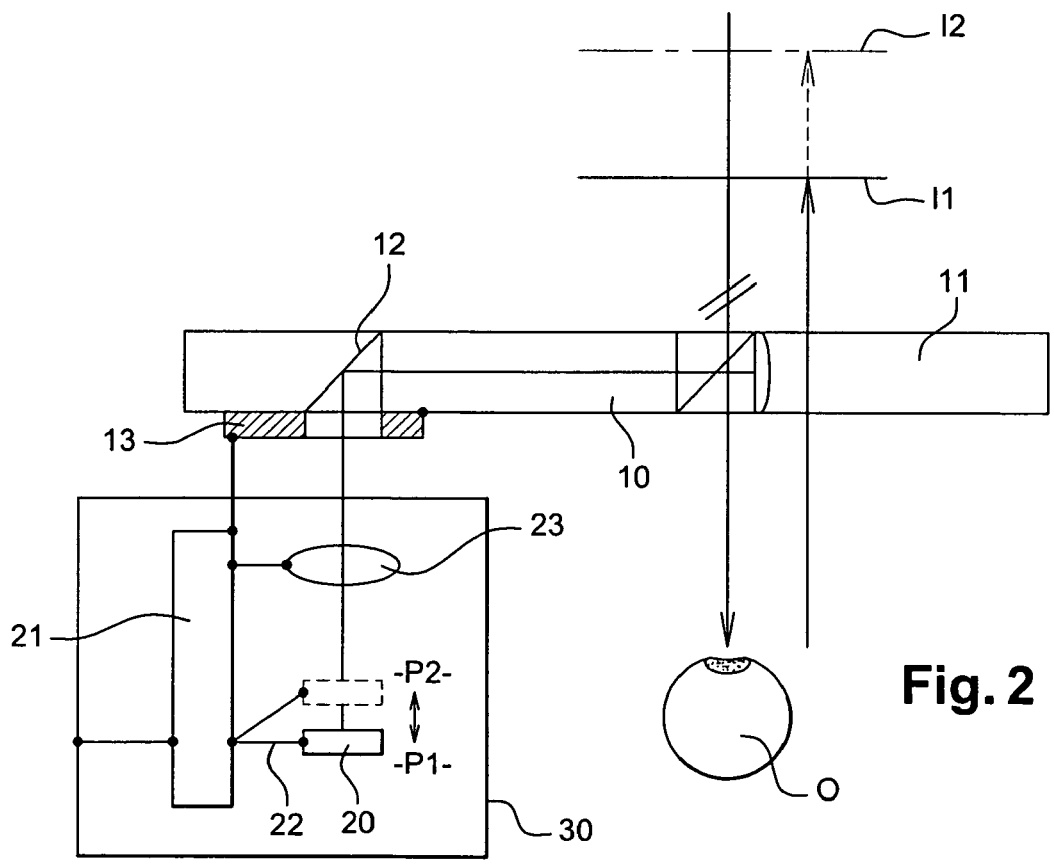
FIG. 2 is a diagrammatic plan view of a display in accordance with the invention.
Figure 3:
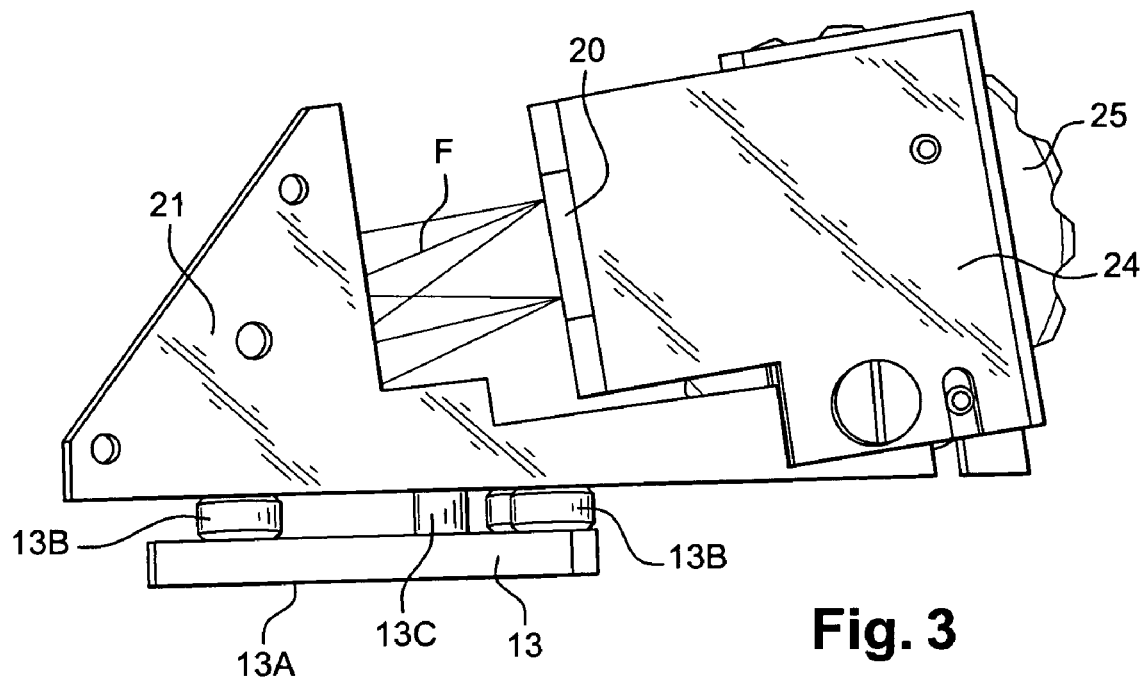
FIG. 3 is a face view of a device for adjusting the focus of a display in accordance with the invention.
Figure 4:
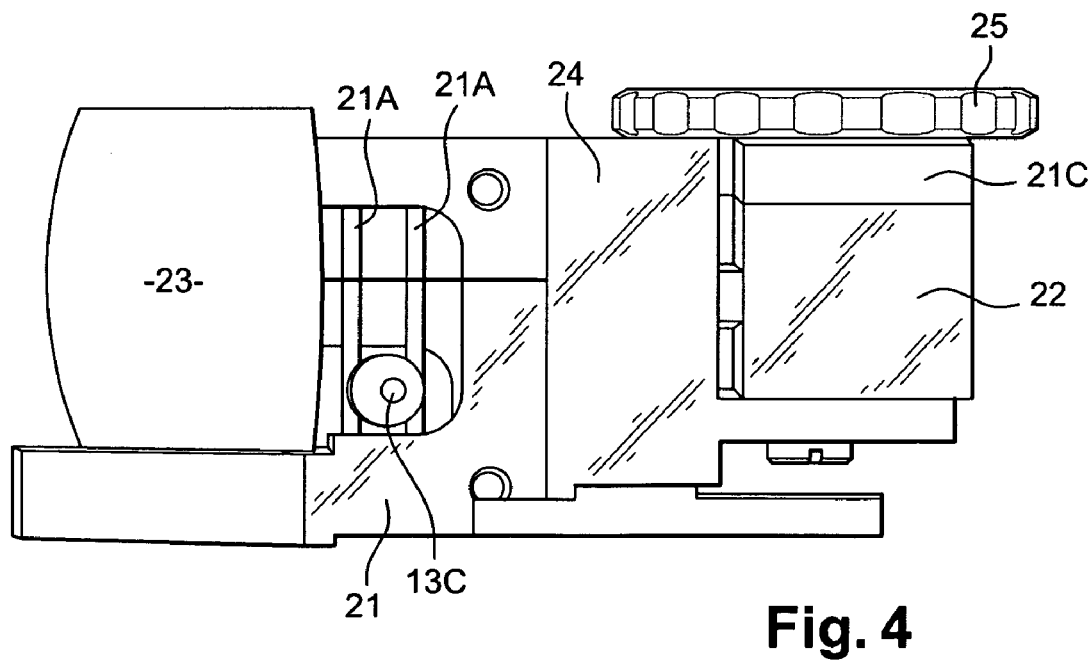
FIG. 4 is a plan view of the same focus adjustment device.

The display is thus shown diagrammatically in FIG. 2.

This ophthalmological display comprises an optical imager 10 for shaping light beams emitted from a miniature screen 20 placed in a housing 30 so as to direct the light beams towards the eye O of the wearer in order to enable information content to be viewed. The imager 10 is of the same type as that shown in FIG. 1. In contrast, the housing 30 is placed against the rear face of the lens 11 that carries the imager. A reflector element 12 for reflecting the light beam through 90° is therefore also integrated in the lens so as to direct said beam longitudinally to the imager 10.

Figure 1:
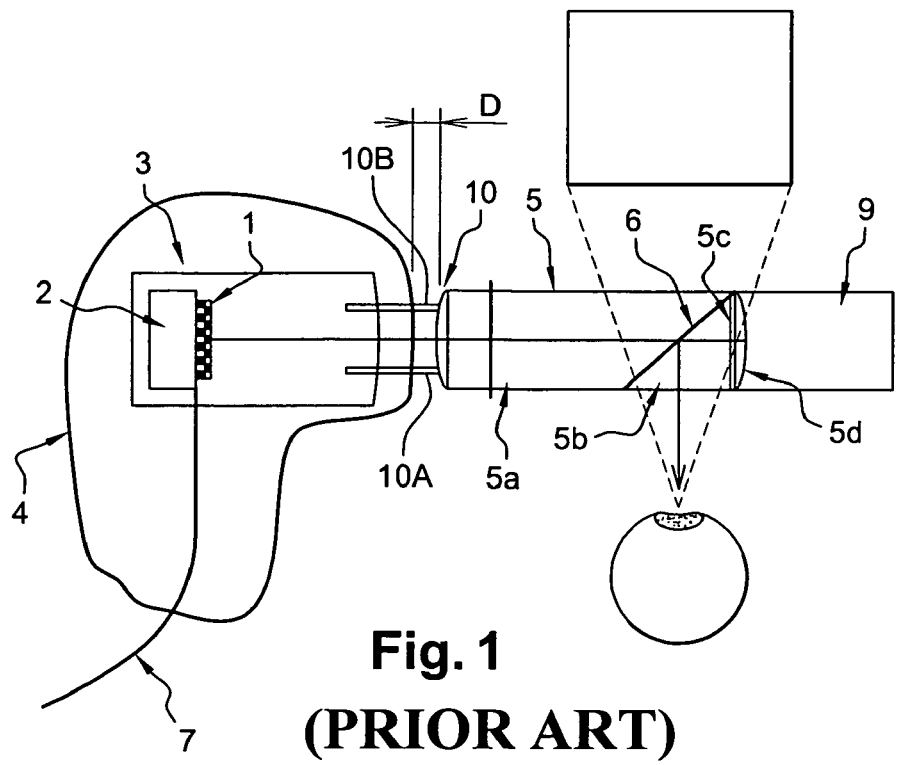
FIG. 1 is a plan view of a prior art display and is described above.

Nevertheless, as will readily be understood, the invention applies equally to an imager of the type shown in FIG. 1 or to an imager of the type shown in FIG. 2.

Firstly, an adapter 13 is bonded accurately on the lens by means of adhesive, and then the adjustment device described below is secured to the adapter. The adapter 13 has two accurately perpendicular sides that enable it to be positioned accurately facing the imager and more precisely facing the reflector element 12.

The adjustment device comprises a stationary plate 21 having the miniature screen 20 secured thereto by an adjustable movable connection 22. It also supports optical components 23 shown diagrammatically. The adapter 13 is secured to the stationary plate 21.

By adjusting the connection 22, e.g. from position P1 to position P2 in which the screen is drawn in dashed lines, the length of the light beams between the screen and the imager is modified, and thus focus is adjusted enabling the image I1 to be viewed at a distance from the eye O that is greater as represented by the dashed-line image I2.

This focus adjustment device is shown in greater detail in a preferred embodiment in FIGS. 3 to 6. In these figures, the housing 30 is omitted.

Figure 5:
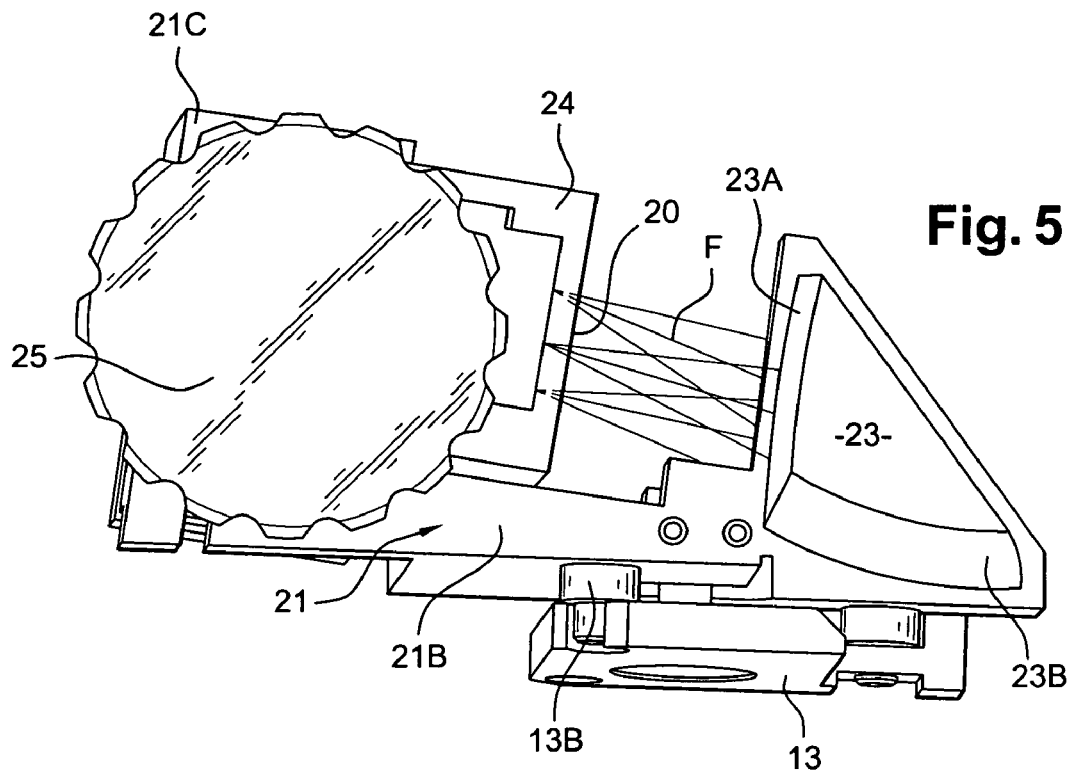
FIG. 5 is a perspective view from behind of the same focus adjustment device.
Figure 6:
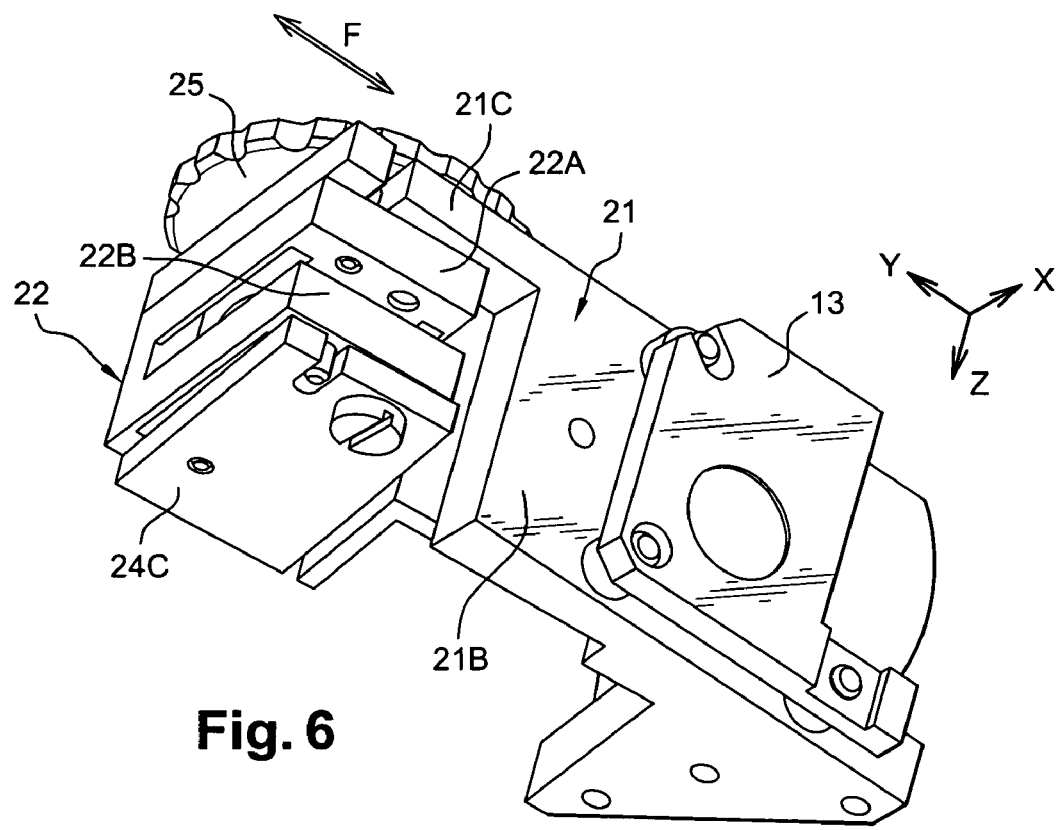
FIG. 6 is a perspective view from beneath of the same focus adjustment device.

The adapter 13 is a substantially square slab whose outside face 13A is to be adhesively bonded to the lens. This adapter 13 has the stationary plate 21 secured thereto by three studs 13B that are engaged in corresponding orifices in the adapter, as can be seen in FIG. 5. These three engaged studs enable relative positioning to be provided that is exact. Furthermore, the adapter 13 includes a snap-fastening peg 13C that snap-fastens between two resilient rods 21A secured to the stationary plate 21 and enabling the plate to be held releasably relative to the adapter 13.

The stationary plate 21 includes the optical component downstream from the miniature screen, and more precisely in this example it includes a lens 23. This lens 23 redirects the light beams F that it receives from the screen 20 via its face 23A towards the imager inserted in the eyeglass lens via its face 23B.

The screen 20 is carried by a second plate 24 connected to the stationary first plate 21 by a moving connection constituted by an elastically-deformable element so as to enable the distance between the screen 20 and the inlet face 23A of the lens 23 to be adjusted.

To do this, the stationary plate 21 has a base 21B that is substantially parallel to the axis of the inlet face 23A of the lens, and a lug 21C perpendicular to said base and placed on one of its sides. This lug 21C is connected to the first branch 22A of a deformable fork 22 whose other branch 22B is connected to a lug 24C of the second plate 24. These connections can be seen particularly clearly in FIG. 6. The lugs 21C and 24C have respective slots at their ends receiving respective pegs carried by each of the branches 22A and 22B.

These branches 22A and 22B can move relative to each other in the direction of arrow F under drive from an actuator device external to said housing, and constituted in this example by a knob 25.

Figure 7:
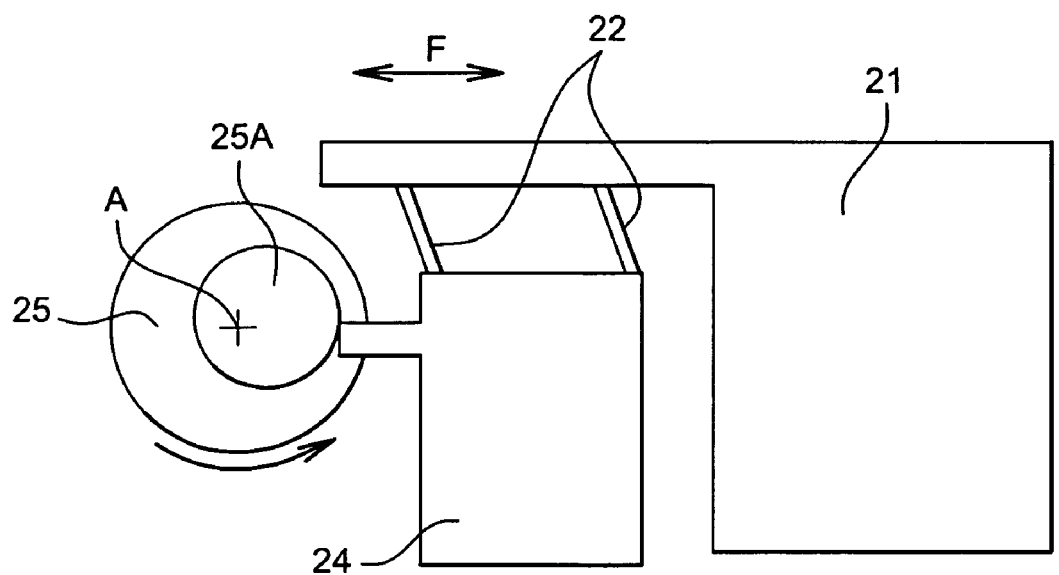
FIG. 7 is a diagrammatic view of a first variant actuator device forming part of a display in accordance with the invention.

Although visible only from the outside in FIGS. 3 to 6, the knob actuator device 25 is represented diagrammatically in FIG. 7 in a manner that can be understood by the person skilled in the art.

This figure shows the stationary plate 21, the moving second plate 24, and the elastically-deformable element 22.

The knob 25 can be turned about its axis of rotation A and it carries a cylindrical eccentric 25A which is in abutment against a face of the second plate 24. As shown clearly in FIG. 7, when the knob is turned, this cylinder pushes the second plate 24 and then releases it, whereupon the second plate returns in the opposite direction because of the resilience of the connection 22 and remains in abutment against the cylinder 25A.

Figure 8:
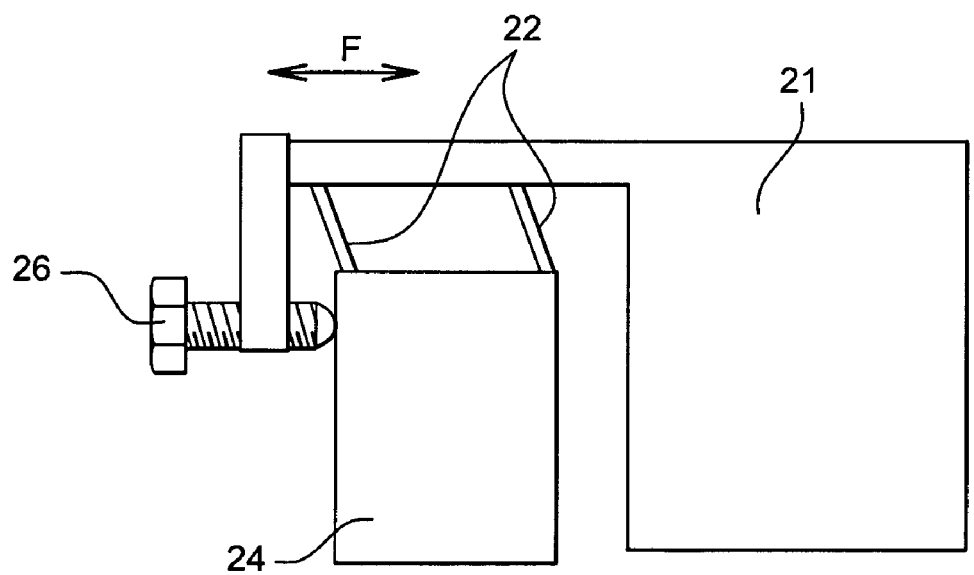
FIG. 8 is a diagrammatic view of a second variant actuator device forming part of a display in accordance with the invention.

In a variant, it is possible to use a screw instead of a knob, and this is shown diagrammatically in FIG. 8, or more generally it is possible to use an adjustable abutment. A screw 26 is then turned in a tapped bore secured to the stationary plate 21 and its end comes into abutment against a face of the moving plate 24.

Although the housing 30 is not shown in FIGS. 3 to 6, the stationary plate 21 and the second plate 24 are both contained in the housing, as shown diagrammatically in FIG. 2.

In the embodiment described, it is the miniature screen that constitutes the optical element connected to the stationary plate by a moving connection that is adjustable by means of an actuator device external to said housing.

In the context of the invention, it could be the optical component as constituted for example by the lens 23 or the screen-plus-lens assembly that occupies a position that is adjustable by means of the adjustable moving connection. In all circumstances, the purpose is to vary the optical distance, i.e. the length of the light beams processed by the display.

The invention claimed is:

1. An ophthalmological display comprising:
    an optical imager for shaping light beams emitted by an optical element of a light beam generator system and for directing the beams towards an eye of a wearer so as to enable information content to be viewed, the display being fitted with a focus adjustment device for adjusting the length of said light beams between said element and the imager, said imager being integrated in a lens for mounting in a frame for eyeglasses,
    wherein said adjustment device is internal to a housing containing said light beam generator system, and in that said generator system includes a stationary part referred to as a stationary plate, having connected thereto said optical element, via a moving connection that is an elastically-deformable element and is adjustable by an actuator device.

2. A display according to claim 1, wherein said optical element is secured to a second plate connected to the stationary first plate by said moving connection.

3. A display according to claim 1, wherein said actuator device is external to said housing.

4. A display according to claim 1, wherein said elastically-deformable element is a deformable fork.

5. A display according to claim 1, wherein said actuator device is a knob provided with an eccentric cylinder, said knob being mounted to turn relative to a stationary portion of the housing and said eccentric cylinder being in abutment against said second plate.

6. A display according to claim 1, wherein said actuator device is a screw screwed into a stationary portion of the housing and in abutment against said second plate.

7. A display according to claim 1, wherein an adapter is in a reference position relative to the imager and receives said generator system together with its focus adjustment device by engagement of at least two studs.

8. A display according to claim 7, wherein the connection between said system and said adapter (13) is releasable.

9. A display according to the claim 1, wherein said adapter is secured to said stationary plate.

10. A display according to claim 1, wherein said optical element is a miniature screen.

11. A display according to claim 1, wherein said stationary plate carries an associated optical component.

* * * * *